INSERTION MACHINE CONTROL SYSTEM

Filed Dec. 28, 1966 5 Sheets-Sheet 1

Inventor:
Norton W. Bell

By Griffin and Branigan
Attys

INSERTION MACHINE CONTROL SYSTEM

Filed Dec. 28, 1966 5 Sheets-Sheet 2

Inventor:
Norton W. Bell

By Griffin & Branigan
Attys

Inventor:
Norton W. Bell
By Griffin & Branigan
Attys

INSERTION MACHINE CONTROL SYSTEM

Filed Dec. 28, 1966 5 Sheets-Sheet 4

Inventor:
Norton W. Bell
By Griffin & Branigan Attys

INSERTION MACHINE CONTROL SYSTEM

Filed Dec. 28, 1966 5 Sheets-Sheet 5

Inventor:
Norton W. Bell.
By Griffin & Branigan Attys

United States Patent Office 3,490,761

Patented Jan. 20, 1970

3,490,761

INSERTION MACHINE CONTROL SYSTEM

Norton W. Bell, Pasadena, Calif., assignor to The Bell and Howell Company, Chicago, Ill.

Filed Dec. 28, 1966, Ser. No. 605,273
Int. Cl. B65h *39/02;* B65b *57/10*
U.S. Cl. 270—58 24 Claims

ABSTRACT OF THE DISCLOSURE

There is herein disclosed a single track photoelectric document scanner which derives output pulses from a master document and delivers them to a counter. The counter serially counts the output pulses and a synchronized counter readout system generates simultaneous readout pulses which are representative of the count in the counter. An insertion station control means is operative in response to the readout pulses to control the subsequent operation of insertion stations.

This invention relates to an improved, multistation inserting machine of the type described in quite some detail in U.S. Patents 2,325,455 and 3,260,517. Both of these patents relate to multistation inserters which are presently produced and marketed by the assignee of the present application, and well known in the market as the Phillipsburg inserters.

In both of the above-noted patents, a master document is withdrawn from a master document station and moved onto an insert track which has a suitable conveyor means for moving the master document past a plurality of insertion stations. As the master document is thusly moved, additional documents from the insertion stations are stacked with the master documents. The master documents and their insertions are then inserted into mailing envelopes by well-known means.

Patent No. 3,260,517 is particularly directed to an improvement of Patent 2,325,455 and relates to a device for deriving signals from particular master documents and using those signals to control the subsequent insertion of documents from only selected insertion stations. In that structure, however, a separate scanning or reading means is required to be placed at the master document reading station for each of the subsequent insertion stations. With the advent of more complex insertion machines, which can include 20 or more insertion stations, this structure becomes too cumbersome. Accordingly, it is an object of this invention to provide an improved insertion control system which requires only a single reading or scanning mechanism at the master document station in order to provide control signals for the subsequent insertion of documents in accordance with suitable coded indicia on the thusly scanned master documents.

In accordance with a principle of the invention, the above-noted object is accomplished by providing each master document with a suitable coded indicia which corresponds to the particular insertion material that it is desired to have subsequently inserted with that master document. These coded indicia are then counted by an electronic counter and the output from the counter is used to control the subsequent insertion operations of the insertion stations. A counter which is suitable for use in this respect is disclosed in my copending patent application entitled "Counter Circuit" Ser. No. 605,477 which is filed on even date herewith and assigned to the same assignee.

As insertion machines have become more sophisticated, it has become desirable to include a plurality of subordinate documents along with each of the master documents that are fed from the inserter's master document station. An example of a machine of this type would be one with which a gasoline distributor might prepare gasoline-purchase statements for mailing. In this case, the distributor would have various types of customers to which it is sending bills. For example, one bill might be directed to an average automobile owner; the next bill might be directed to a taxicab driver; and the third bill might be directed towards a corporation owning a fleet of widely travelled vehicles. Each of these customers, therefore, would have a widely-divergent number of subordinate cards, each of which represents a separate purchase by that customer.

In the above case, the documents at the master station would be comprised of a plurality of master cards, each of which represents a separate customers; and each of these master cards would be followed by a plurality of subordinate cards, each of which represents a separate purchase by that customer during the month.

From the above discussion, it will be apparent that where the number of subordinate documents is large, the insertion machine's main feed or insertion track must be stopped during that time that the large number of subordinate documents are being fed. Or, alternatively, a rather complex system must be employed for inhibiting the operation of the subsequent insertion stations for variable periods of time during which variable numbers of subordinate documents are being fed. In the past, this problem has been partially solved by employing high speed feeders which are adapted to feed subordinate cards at a far greater rate than the speed with which they are subsequently moved along the insertion track. When this solution has been employed, the time that it takes to move a given master document from one insertion station to the next has been generally equivalent to the time that is required to feed all of the subordinate documents for the customer having the largest number thereof. This, however, has resulted in a less than optimum insertion machine output, because the insertion track must be stopped for long periods of time even though a given customer has only a small number of subordinate cards. Hence, it is another object of this invention to provide a control system for an insertion machine which permits the machine's main feed to run as rapidly and as continuously as is practically possible.

Broadly speaking, this later object of the invention is accomplished by using the output from the electronic counting circuit to control both the high speed feeder and the insertion machine's main feed as well as the operation of each of the subsequent insertion stations.

The indicia on each customer's master card indicate not only that all of the preceeding customer's subordinate cards have been fed, but the number of these indicia indiciates the type of customer that is billed and, therefore, the type of material that should be subsequently inserted. For example, one indicium might represent the average automobile owner; two indicia might represent the taxi driver's account; and three indicia might represent the corporate account, and so on.

More specifically, therefore, and in acocrdance with the machine optimization aspects of the invention, when an indicium on a master card is detected this indicates that all of the preceeding customer's subordinate cards have been fed and the high speed feeder is stopped. A timing device is operated by the insertion machine's main feed and functions to shut off the main feed if a customer's master document has not been fed during a machine cycle (a machine cycle being the time required for the main feed belt to move from one insertion station to the next). Each of the succeeding insertion stations is then operative or not in response to the number of marks counted so that the subsequently inserted material can be correlated to the type of customer that is being billed.

So long as the number of a particular customer's subordinate cards is not too large, the main feed belt can be substantially continually operated. If the number of a given customer's cards is so large that it takes longer than one machine cycle to feed them, however, the main feed is stopped until the high speed feeder has fed all of that customer's cards. On the other hand, if an individual customer's cards are all fed in less than one machine cycle, another timing device is used to stop the high speed feeder until that machine cycle is completed. Hence, both the high speed feeder and the machine's main feed are only shut down as dictated by each individual customer's needs.

Two alternative embodiments of an insertion machine control system are also described. Those embodiments not only provide for control over the number of insertion stations that are actuated by the counter, but they also control which of not necessarily adjacent insertion stations are to be operated in connection with a particular master document. Basically, this is accomplished by synchronizing a photocell reader's output pulses to determine not only their number but their location. In one of the alternative embodiments the counter is modified to a binary shift register type so that the state of its various stages—either ON or OFF—can be used to selectively control subsequent insertion station operations. In the other alternative embodiment selective control is obtained by inserting a decoding circuit between a counter and the insertion stations.

The foregoing and other objects, features and advantages of this invention will be apparent from the following particular description of preferred embodiments thereof, as illustrated in the accompanying drawings where the same reference numerals refer to the same parts throughout the various views. The drawings are not necessarily intended to be to scale, but rather are presented so as to illustrate the principles of the invention in clear form.

Figure 1:
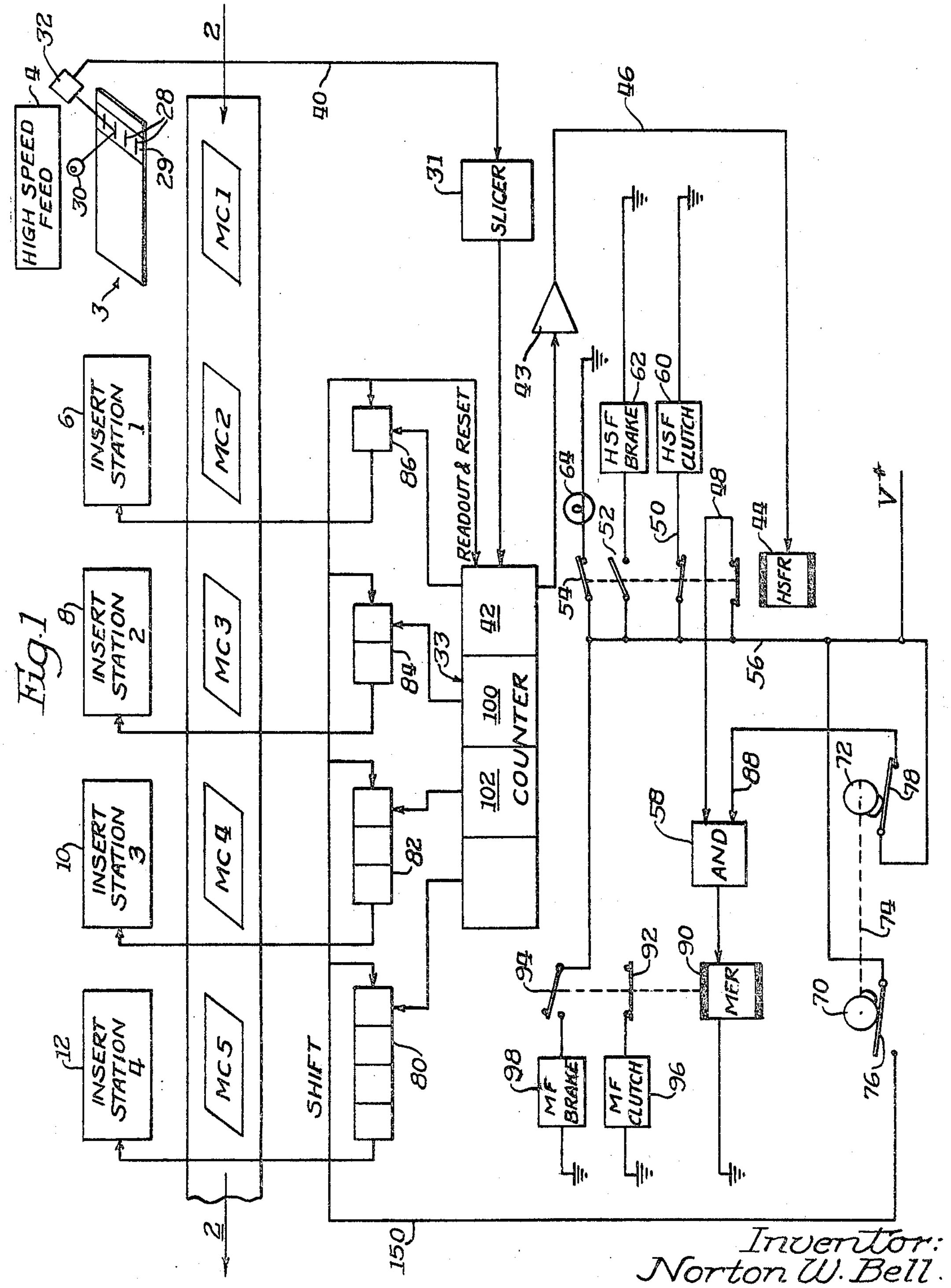
FIG. 1 is a schematic drawing of a preferred structure and circuit arrangement which embody the principles of the invention.

A preferred embodiment of the invention will now be described in terms of its ability to employ a photodetection system to operate an electronic counter register which in turn controls the systems' high speed feeder and its main feed as well as the operation of the machine's insertion stations. With reference to FIG. 1, the inserter's main feed track 2 carries documents from a position opposite a stacking station 3 of a high speed feeder 4 past four subsequent insertion stations 6, 8, 10, and 12. These operations occur during the machine cycles 1 through 5 (MC1–MC5). After passing the fourth insertion station 12 at MC5, each stack of documents is passed on to an envelope stuffing station, not shown.

Figure 2:
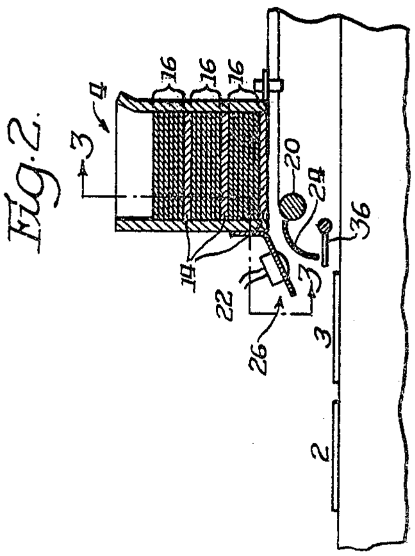
FIG. 2 is a schematic drawing illustrating a side view of a high speed feeder that is suited for use with the invention.
Figure 3:
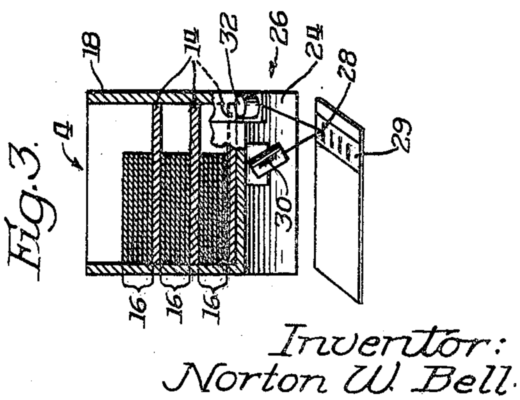
FIG. 3 is a vertical sectional view taken along lines 3—3 of FIG. 2.

The insertion machine with which this invention finds particular utility employs a high-speed feeder for feeding a master document which is sequentially followed by a variable number of subordinate documents. FIGS. 2 and 3 illustrate a suitable type of high-speed feeder 4 which is adapted to feed each master card 14 followed by a widely variable number of subordinate documents 16. Because the structure and specific operation of this high speed feeder comprises no part of the instant invention, it will only be described very briefly at this time. In this respect, the master and subordinate documents are contained in a hopper 18 and are fed therefrom by means of any suitable selectively operable feed roller 20, or the like. As each document leaves the throat of the hopper, it passes over a guide 24 and under a photoelectric reader 26.

Each master document 14 has a selected, but predetermined number of hyphens 28 located in a field 29 thereof. As will be described more fully shortly, therefore, as each master document passes under the photocell reader 26, light from the reader's lamp 30 is reflected from the master document so that a photocell 32 produces a series of output pulses which are delivered, through a slicer 31 (FIG. 1) to a counter circuit 33. As the subordinate documents 16 are fed from the high-speed feeder, however, no output pulses are derived from the photocell 32 because the subordinate documents are shorter than the master documents and thereby do not pass under the lamp 30's rays. In this respect, it should be noted that although the master documents are illustrated as being distinguishable from the subordinate documents by virtue of their size, this is not necessarily the case. For example, where the photocell 32 is responsive to only limited ranges of reflected energy, the master and subordinate documents may be conveniently distinguished by their colors.

As is about to be described in connection with the machine optimization aspects of this invention, both the high speed feeder and the main feed, as well as the insertion stations, are controlled by the electronic counter 33 as it operates in response to outputs from the photocell 32. That is, once the high speed feeder is put into operation, it sequentially feeds both a master document and its subsequent subordinate documents. As soon as the next master document passes under the photocell reader, but before it is deposited at the stacking station 3, the photocell pulses the counter and the high speed feeder is stopped. In the meanwhile, the main feed track carries preceeding document stacks to a position opposite their next insertion stations. If there are more subordinate documents than can be fed during a given machine cycle, the track feed is stopped and the high speed feed is permitted to continue. If, on the other hand, the next master document is fed from the high speed feeder before the completion of a machine cycle, then the counter stops the high speed feeder and permits the main insertion track feed to continue. In addition, each of the photocell's pulses to the counter are stored to control subsequent operations of the insertion stations.

After each master document and its subordinate documents are deposited at the stacking station 3, they are fed onto the insertion machine's main insertion feed track 2 by means of a suitable secondary feeding mechanism which is illustrated schematically as 36 in FIG. 2. After the master stack is thusly fed onto the main feed track, it is sequentially moved past the successive insertion stations 6–12. In this respect, the time required for the main feed to move from one insertion station to the next is referred to as one machine cycle (MC). Hence, if a master stack is placed onto the main feed track at machine cycle one (MC1 in FIG. 1), it reaches insertion station 12 four machine cycles later at machine cycle five (MC5). In this respect, however, it should be carefully noted that although each machine cycle extends over a fixed time duration, there may be intervals of time between adjacent machine cycles, and, moreover, these intervals are not necessarily equal, but instead vary depending upon the variable number of subordinate documents that follow their related master document out of the high speed feeder.

Returning now to FIG. 1, the insertion station control and machine optimization aspects of the invention will be described in more detail. As noted above, as each master document is passed under the photocell reader 26 the photocell 32 produces outputs to the slicer 31 on line 40. The slicer 31 acts as a threshold or weighing circuit to pass only those of the photocell's output pulses that are produced in response to marks 28 on the document's field 29.

Each output from the slicer 31 is delivered to the counter register 33 and turns on that register's first stage 42. The state of the counter's first stage 42 is sampled; amplified by any suitable means at 43; from which a representative signal is delivered to a high speed feed control relay (HSFR) 44 on line 46. The HSFR, in turn, controls four sets of contacts 48, 50, 52, and 54. These contacts control the application of a positive voltage on a bus 56 to a two-input AND gate 58, a high speed feed clutch 60 and a high speed feed brake 62, and a lamp 64.

Two cams 70 and 72 are driven by the insertion machine's main feed by means of a common shaft illustratively indicated by a dotted line 74 in FIG. 1. As noted above, it is the main feed that also drives the machine's insertion track. The cams 70 and 72 comprise part of a circuit breaker assembly having first and second limit switch elements 76 and 78, respectively. The first limit switch 76 controls the application of a suitable shift voltage such as from bus 56 to each of the input stages of four insertion station control registers (insert registers) 80, 82, 84, and 86, as well as a readout and reset voltage to the first stage 42 of the counter register 33.

The second limit switch 78 controls the application of a suitable voltage such as from bus 56 to the second input of the AND gate 58 on line 88. AND gate 58's output controls a main feed relay (MFR) 90 which, in turn, controls contacts 92 and 94 for applying voltage from bus 56 to a main feed clutch 96 and a main feed brake 98, respectively.

Figure 4:
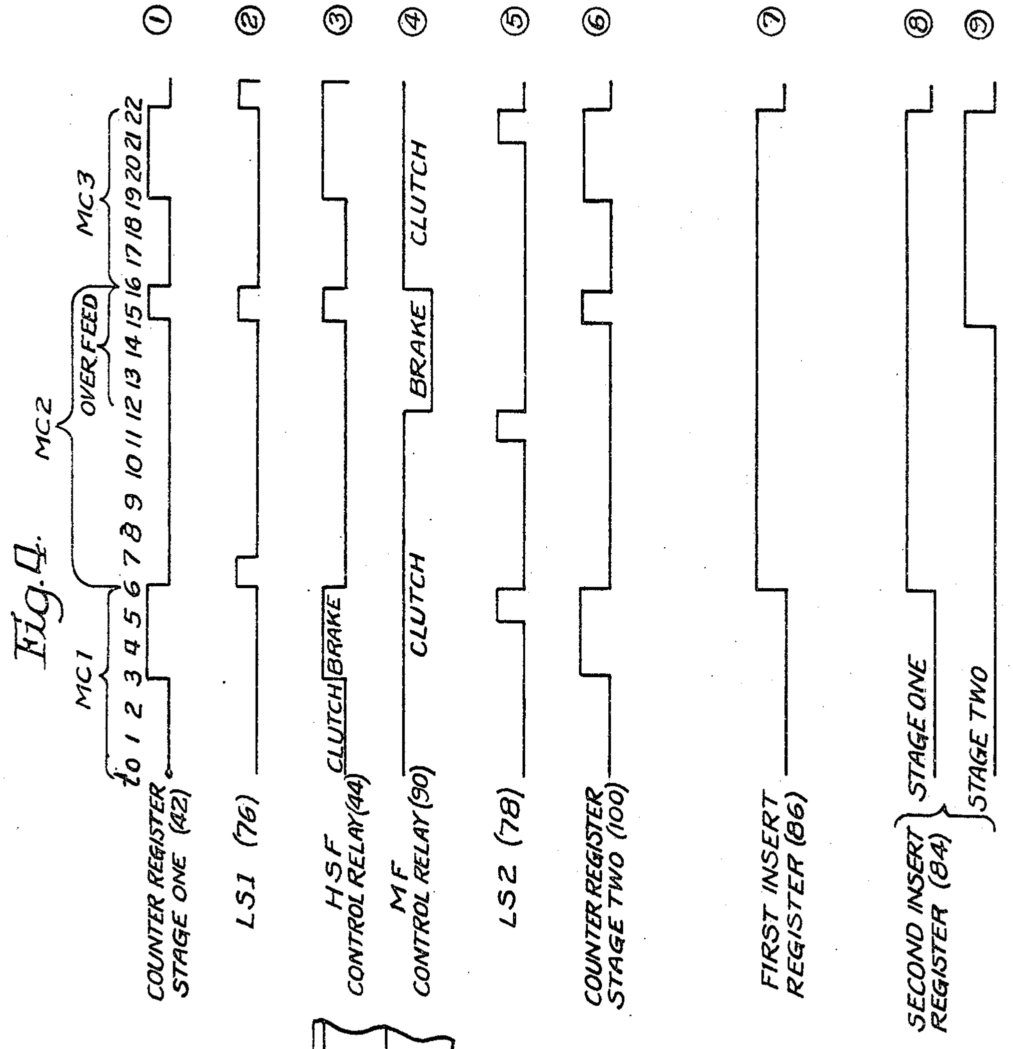
FIG. 4 is a timing diagram illustrating various voltage level changes in certain of the FIG. 1 structure's components, as the high speed feeder operates upon various combinations of master and subordinate cards.

Having described the structures for the insertion machine's circuit, their operation will now be described. In this respect, assume that all of the various register stages are in their no voltage or OFF states. Assume further that a first master document has passed under the photocell reader and has been placed at the stacking station 3. With reference to lines 1, 6, 7, 8, and 9, of the timing diagram of FIG. 4, therefore, all of the various register stages about to be discussed are OFF and the subordinate documents associated with the first master document are being fed by the high speed feeder. Hence, the high speed feeder's clutch 60 is engaged (line 3) as is the main feed clutch (line 4), which causes the main feed track to move preceding document stacks from one insertion station to the next. Also, at this time, both the limit switches 76 and 78 are closed (lines 2 and 5).

For purposes of this example, it will also be assumed that the master document which has just been fed is followed by three subordinate documents. These documents are illustrated as being fed during the times $t_0$, $t_1$, and $t_2$, in FIG. 4. At $t_3$, however, the next master document passes under the photocell reader 26. At that time, the photocell 32 generates a series of output pulses to the slicer 31, there being one output pulse corresponding to each hyphen 28 in that master document's field 29. These pulses cause a corresponding series of output pulses from the slicer 31 to be delivered in seriatum to the first stage of the counter 33. The counter 33 is of the type in which each pulse delivered to stage 42 causes the preceding pulse to be shifted into the counter's second stage 100 which causes its preceding pulse to be shifted into the counter's third stage 102 and so on. The above noted copending application Ser. No. 605,477 describes a suitable counter of this type.

As soon as the counter's first stage is turned on in response to the next master document's hyphens 28, the high speed feeder relay 44 is energized by a signal from the counter stage 42 and amplifier 43 on sample line 46. As indicated at time $t_3$ in FIG. 4, therefore, the contact 50 is opened, the contact 52 is closed, and the high speed feeder is stopped by virtue of its brake 62's application. At this time, therefore, although the main feed track continues to move preceding documents leftwardly in FIG. 1 to their next insertion station, the high speed feeder itself is stopped.

Just prior to the end of the first machine cycle (MC1)—that is, just prior to the time that preceding document stacks reach a position opposite their next insertion station, the cam 72 closes the second limit switch 78 to provide a first input on line 88 to AND gate 58. The contact 48, however, was opened by the high speed feed relay 44 at $t_3$. Hence, there is only one input to the AND gate 58 which thereby provides no output.

As soon as the first machine cycle has been completed, and the preceding document stacks are opposite their next insertion stations, the cam 70 opens the first limit switch 76. This causes the first stage of each of the insertion station control registers to be shifted into the respective register's second stage and also causes each of the counter register's stages to be read out into the thusly vacated first stages of the corresponding insertion station control registers 80–86. In this connection it should be noted that the control system also includes certain delay elements which, for purposes of clarity and simplicity, have not been illustrated. It will be appreciated, for example, that there should be a slight delay between the time that the insertion registers are shifted and the time the counter register is read out and reset. This, and similar other delays will be apparent, however, to those skilled in the art. With suitable delay, therefore, when the various stages of the counter register 33 are read out they are also thereby cleared. Hence, at $t_6$ the voltage level on sampling line 46 drops; the high speed feed relay 44 is de-energized; the high speed feed clutch is re-energized and the high speed feed brake 62 is released. At the same time because the main feed relay 90 has not been energized thus far, the main feed clutch continues to be engaged so that both the high speed feeder and the main feed are operative.

Also note that the single stage of the first insertion station control register 86 was turned on during the readout of the counter register's first stage 42; that the first stage of the second insertion station's control register 84 has been turned on by the second counter register stage's readout; and that the second stage of the second insertion station's control register remains OFF. These conditions are also illustrated at $t_6$ in FIG. 4.

The high speed feeder is responsive to the de-energization of its relays to move the second master document to stacking station 3 and feed subordinate documents from the hopper 18 (FIG. 3). At the same time the main feed moves the first master document and its corresponding subordinate documents along the main feed track toward a position opposite the first insertion station 6 during machine cycle (MC2). At the end of MC2, ($t_{12}$ in FIG. 4) the first master document and its subordinate documents have been transported to a position opposite the first insertion station 6. Just prior to this time, however, the second limit switch 78 was closed by the cam 72 so that a first input was applied to AND gate 58 on line 88. In this example, however, the high speed feeder has not yet fed all of the subordinate documents that correspond to the master document now located at stacker station 3. Hence, the third master document has not yet passed under the photocell reader 26; the slicer has produced no subsequent outputs; the first counter register stage 42 is still OFF; and the high speed feeder relay 44 remains unenergized. Consequently, contact 48 is closed and AND gate 58 is provided with its second input whereby the main feed relay 90 is energized; the main feed clutch is released; and the main feed brake 98 is applied so that the first master document stack is stopped at its position opposite the first insertion station 6.

Because the main feed was stopped at $t_{12}$, the cam 70 is temporarily stationary at a point where the first limit switch 76 is just about to open. When all of the second master document's subordinate cards have been fed, the third master document passes under the photocell reader 26 and the high speed feed relay 44 is energized at $t_{15}$ in the same manner as was discussed above. Also in the manner noted above, the high speed feeder is braked at $t_{15}$ and the main feed clutch 96 is energized. At this same time, therefore, the cam 70 rotates so as to close the first limit switch 76 and apply shift pulses to each of the insertion station control registers 80–86. With respect to control register 86 which has only a single stage, however, its previously stored pulse is operative upon shifting to actuate the insertion mechanism at the first insertion station 6 whereby one or more pieces of insertion material from that station are added to the first master document's stack just as that stack is about to be moved onto the second insertion station 8 during the third machine cycle (MC3). This pulse from the second insertion station control register's first stage, however, is shifted into that register's second stage at $t_{15}$.

A readout and reset pulse is also applied to the counter register's first stage 42 at $t_{15}$ when the first limit switch 76 is closed. This, therefore, causes the signal stored in the counter register's second stage 100 to be read into the second insertion station control register's first stage leaving it ON. This, however, assumes that the second master document contained at least two hyphens thereby indicating that it was to have material from both the first and second insertion stations placed therewith as it was moved along the main insert track 2. Had the second master document contained only one hyphen, thereby indicating that only the first insertion station's material were to be placed therewith, the second stage 100 of the counter register 33 would not have been energized during the second machine cycle; and the second stage of the second insertion station control register 84 would not be energized at the beginning of the third machine cycle $t_{16}$, as indicated in the timing diagram of FIG. 4.

Having described the insertion machine's operation for two machine cycles, including one cycle having a "short" stack of subordinate documents, and another cycle having a "long" stack of subordinate documents, it will be appreciated by those skilled in the art that subsequent machine cycles are carried out in a similar manner. For example, just after the third machine cycle has ended, and the limit switch 76 causes the counter register 33 to be read out and reset, the output stage of the control register 84 causes the second insertion station to be operative depending upon whether its corresponding master document was appropriately marked. This operation is repeated until such time as the particular master document stack passes its last insertion station and is inserted into an envelope.

It will also be appreciated by those skilled in the art that although the invention has been described in terms of a single hyphen being operative to control the first insertion station, this is not necessarily so. For example, if it were desired that certain of the master documents have no material inserted therewith, it is merely necessary that the counter include a preliminary stage that is not read out into an insertion station control register, whereby two hyphens would be required in order for that particular master document to receive insertion material from the first insertion station.

In addition, it should be appreciated that the above described structure is operative to stop the high speed feeder when a particular master card is followed by a relatively small number of subordinate cards. The main feed, however, is only terminated if a particular master document is followed by a relatively large number of subordinate cards. Hence, the main feed can be substantially continuously operated except for those cases where a large number of subordinate documents follow their master documents. In this respect, it should be noted that prior art machines have generally required the insertion track to be stopped during each machine cycle for a period corresponding to that required to feed the largest number of subordinate documents. This is not at all the case with the instant invention's structure where the machine's output rate is almost entirely limited by the speed of the insert track. Moreover, not only is the insertion machine's overall operation time optimized, but the counter circuit employed in the optimization is also used to control subsequent insertion stations so that only the desired stations are operative. In addition, the above described control circuit insures that the desired insertion stations are only operative at the proper times in accordance with a variable length of time between machine cycles which corresponds to a similarly variably number of subordinate documents that are associated with a given master document.

Figure 5:
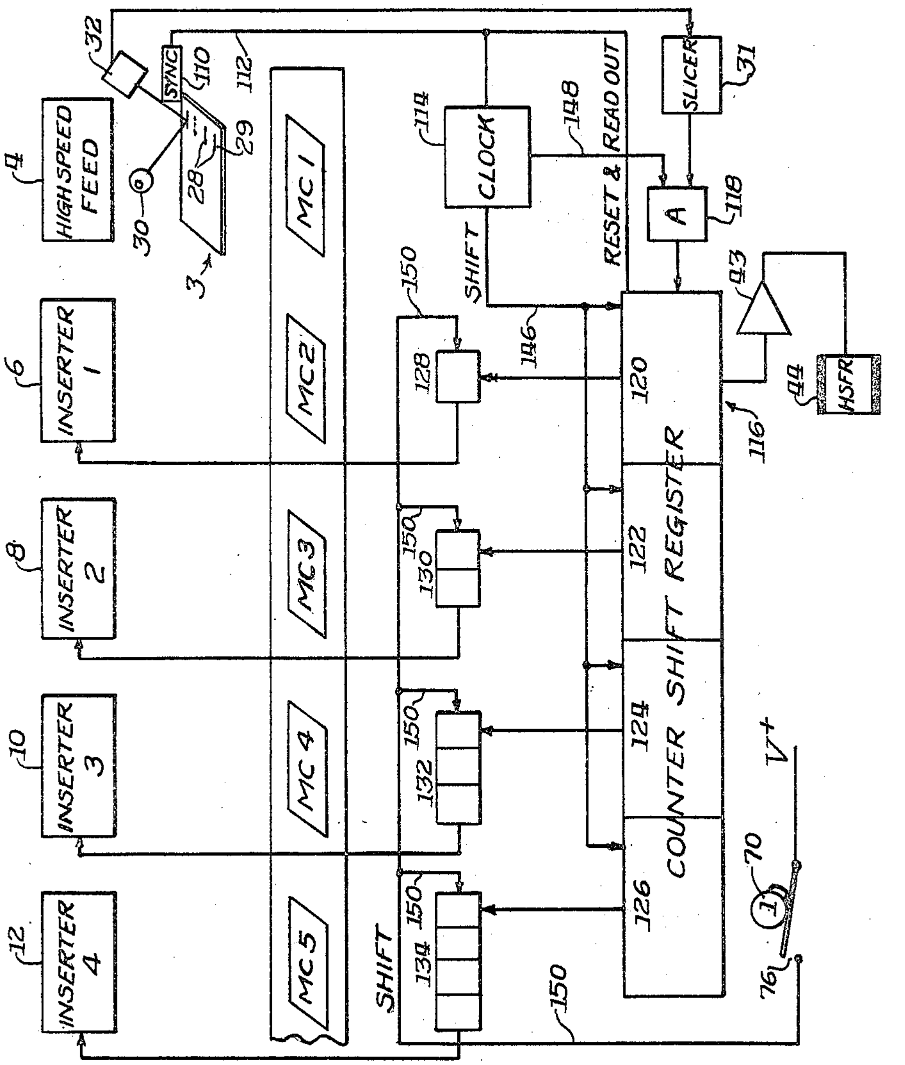
FIG. 5 is a schematic diagram of an alternative insertion machine control system, wherein the counter is used to control randomly selected insertion stations.

Having described a basic embodiment of the invention, an alternative embodiment of the invention will now be described in connection with FIG. 5. In this embodiment the counter register is not only operative to control the insertion of desired pieces of material with particular master documents, but it is also operative to control only selected insertion stations as determined by the location of a hyphen on a given master document rather than merely the number of hyphens on a particular document. In this manner, therefore, while the first embodiment was satisfactory to control the number of insertion stations that are sequentially operated, the embodiment about to be described is not restricted to sequential operation of adjacent insertion stations, but instead permits random insertion station selection.

This embodiment's high speed feed, main feed, and insertion station structures are substantially the same as those just described. Hence, those aspects of this embodiment will not be further discussed. Also, as in the first embodiment, prior to the time that a master document passes under the lamp 30, the photocell 32 has no output. As soon as a master document leaves this embodiment's high speed feeder, however, it causes a synchronizer 110 to produce an output pulse on line 112 which is delivered to a clock 114 and also resets a counter shift register 116. The synchronizer 110 can be of any convenient type, such as a photocell sensor or perhaps a microswitch. The clock 114 is also of a conventional design and is responsive to the input from line 112 to produce a train of output pulses which it delivers to an AND gate 118. Similarly, the counter shift register is of a conventional type. This register is illustrated as having four stages, 120, 122, 124, and 126. It will be appreciated, however, that the counter shift register may have any desired number of stages.

Each of the counter shift register stages has its output connected to an input stage of a corresponding secondary shift register 128, 130, 132, and 134. Each of these secondary shift registers has an output stage connected to one of the similarly corresponding insertion stations 6, 8, 10, and 12, respectively.

The shift registers are of a conventional type, wherein a signal that is delivered to the input stage is shifted out of that stage to the second stage or an output whenever the input stage receives a shift signal. Similarly, if the register has more than two stages, the signal in the second stage is shifted to the third stage whenever the second stage receives a shift signal. The same operation is repeated for each of the register's stages. The input signal to a given register is generally referred to as being either ON or OFF wherein an OFF signal is usually represented by a zero voltage level and an ON signal is usually represented by some positive voltage level. Whenever a reset pulse is applied to a shift register, all of the stages of that register are reset to their OFF position.

As noted above, the time that it takes the invention's main insertion track to move from one insertion station to the next is referred to as a machine cycle. Conventionally, the various timing requirements of an insertion machine are related to these machine cycles. In other words, a machine cycle is generally the basic time unit of such a device. Hence, it is necessary that the machine produce timing pulses which indicate the beginning or end of each machine cycle. As in the former embodiment, these timing pulses are derived from the circuit breaker 76. This means of deriving a machine cycle's timing pulses, however, are only illustrative. For example, suitable reflective elements can be mounted so as to move with the insert track and periodically activate a photocell circuit as the insert track completes its motion for each machine cycle.

Figure 6:
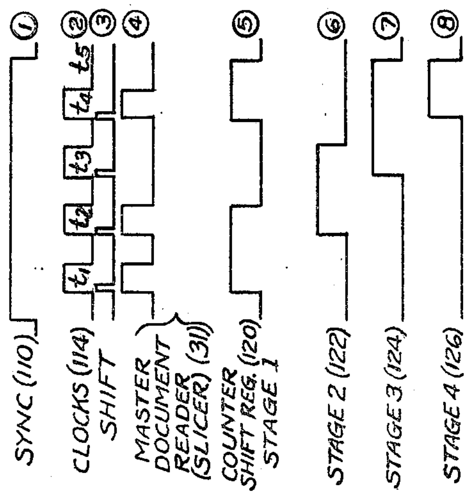
FIG. 6 is a timing diagram similar to that of FIG. 4, but used in connection with the description of the FIG. 5 structure.

Having described the structure of the alternative embodiment's control circuit, its operation will now be described in connection with FIG. 5 and the timing diagram of FIG. 6.

Assume for the moment that there are no document stacks on the machine's main feed track and that the first master document is about to be fed from the high speed feeder. As soon as the first master document passes under the photocell reader 26, the synchronizing means 110 detects the master document's presence and sends a pulse on line 112 to the clock circuit 114. At that time, the clock circuit begins to produce a series of clock pulses, the frequency and duration of which are determined by both the speed with which the master documents are fed from the high speed feeder and the largest number of hyphens which a master document might contain. The illustrated embodiment shows four hyphen positions in the master document's field 29. This is because there are four insertion stations and the presence of a given hyphen indicates that certain corresponding insertion material is to be inserted with that particular master document. In this respect, however, the illustrated embodiment only has hyphens in three of its positions. The remaining hyphen position is therefore shown in dotted form.

A predetermined time after the clock is turned on by the sync pulse (line 1 in FIG. 6) it produces a clock pulse which is delivered on lines 146 and 148 to both the AND gate 118 and each of the counter shift registers stages where it acts as a shift pulse. At this time, however, none of the counter shift register stages are ON whereby the shift pulse has no apparent effect. At about the same time, however, the master document's first hyphen passes under the photocell reader 26 so that the photocell 32's output to slicer 31 drops to the point where the slicer produces an output to the AND gate 118 as shown at $t_1$ on line 4 of FIG. 6. Hence, because the AND gate is now provided with two inputs—one from the clock 114 and the other from the slicer 31—AND gate 118 produces an output to the first stage 120 of the counter 116. After the first hyphen passes under the photocell reader, therefore, the signals in the various stages of the counter 116 are as illustrated at $t_1$ on lines 5–8 of FIG. 6. Particularly, the counter's first stage 120 is now ON.

As soon as the second clock pulse is generated at $t_2$ another shift pulse is produced on line 146 to shift the ON pulse from the counter's first stage 120 to its second stage 122. At the same time, the slicer 31 produces an output in response to the second hyphen of the master document whereby AND gate 118 turns on the counter's first stage 120 again. At $t_2$, therefore, the condition of the counter stages are as illustrated in lines 5–8 of FIG. 6, i.e. the first two stages are ON and the last two stages are OFF.

At $t_3$ a shift pulse from clock 114 is passed line 146 to shift each of the counter stages. The master document in FIG. 5, however, has no hyphen in its third hyphen position. In this case, therefore, at $t_3$ there is no output from the slicer 31 whereby the first counter stage 120 remains OFF. When the last hyphen on the master document passes under the photocell reader 26, however, it causes the counter's first stage 120 to be turned ON. Moreover, in the same manner as was described above, the various register stages are shifted with each shift pulse so that at $t_5$ when the master document is passed from under the photocell reader 26, counter stage 120 is ON; stage 122 is OFF and stages 124 and 126 are ON. Hence, the condition of these shift register stages correspond to the presence or absence of hyphens on the particular master document.

Also as the master document passes from under the photocell reader, the synchronizing means is turned OFF which causes a voltage change on line 112 whereby all of the counter stages are reset to their OFF states.

As was described more completely above in connection with the machine optimization aspects of the invention, the high speed feeder next continues to feed all of the subordinate documents onto the stacking station 3. As soon as the last subordinate document is fed, however, the secondary feed mechanism 36 is actuated to move the first master document and its subordinate documents onto the insert track. At this time, the main feed track begins to move to the left in FIG. 1 so as to carry the first master document and its subordinate documents towards a position opposite the first insertion station 6. This occurs during the second machine cycle (MC2) at the end of which the cam switch 76 produces shift pulses to each of the stages of each of the secondary shift registers 128–134. For purposes of simplicity, these pulses are illustrated as being delivered along the single lines 150.

The first secondary shift register 128 has only one stage. Consequently, the shift pulse on line 150 turns that stage OFF and causes its ON pulse to be delivered to the first insertion mechanism at insertion station 6 which is thereby actuated to deliver its selected material to the insert track with the first master document and its associated subordinate documents. The output stages of the secondary shift registers 130, 132, and 134, however, are OFF at this time. Hence, the insertion mechanisms at stations 8–12 are not actuated.

In the meanwhile, a second master document has been passed under the photocell reader 26 and the counter stages have been set in the same manner as was described above. Hence, during the third machine cycle, when the first master document is moved to a position opposite the second insertion station, the second stage of the secondary shift register 130 is ON. In the same manner as was described above, therefore, as soon as the first master document arrives opposite the insertion station 8, a pulse from the cam switch 76 causes a pulse from the second stage of the secondary shift register 130 to be delivered to the insertion mechanism at insertion station 8. The second insertion mechanism is thereby actuated and insertion material from that station is also added to the first master document's stack. Also at this time, the first insertion station is operated or not depending on whether the second master document contained an appropriate hyphen.

At the end of machine cycle 4, when the first master document's stack arrives opposite the third insertion station 10, the output stage of the third secondary shift register 132 is in an OFF condition. Hence, the shift pulse from camswitch 76 produces no output from the third secondary shift register 132 so that the third insertion station 10 does not add any material to the first master document's stack. At the same time, however, the second and third master document stacks have been added to or not depending upon whether the first and second insertion stations 6 and 8 have received operating pulses from their respective secondary shift registers 128 and 130. This, in turn, is dependent upon whether the respective master documents contained appropriate hyphens.

From the above description, it will be appreciated that a single photocell reader is operative in connection with a high speed feeder to control the selective insertion of desired documents into an envelope with corresponding master and subordinate cards.

As noted above, however, the clock circuit is required to produce a series of clock pulses whose frequency and duration are partly determined by the speed with which the master documents are fed from the high speed feeder. Hence, if the speed of the high speed feeder varies appreciably, either the clock pulse frequency has to be varied accordingly or errors will occur. The following still further embodiment of a selective insertion station control system therefore, is intended to overcome this drawback.

As in the case of the first alternative embodiment the high speed feed, main feed, and insertion station structures are substantially the same as those described above. Hence, those aspects of this embodiment will not be further discussed.

Figure 7:
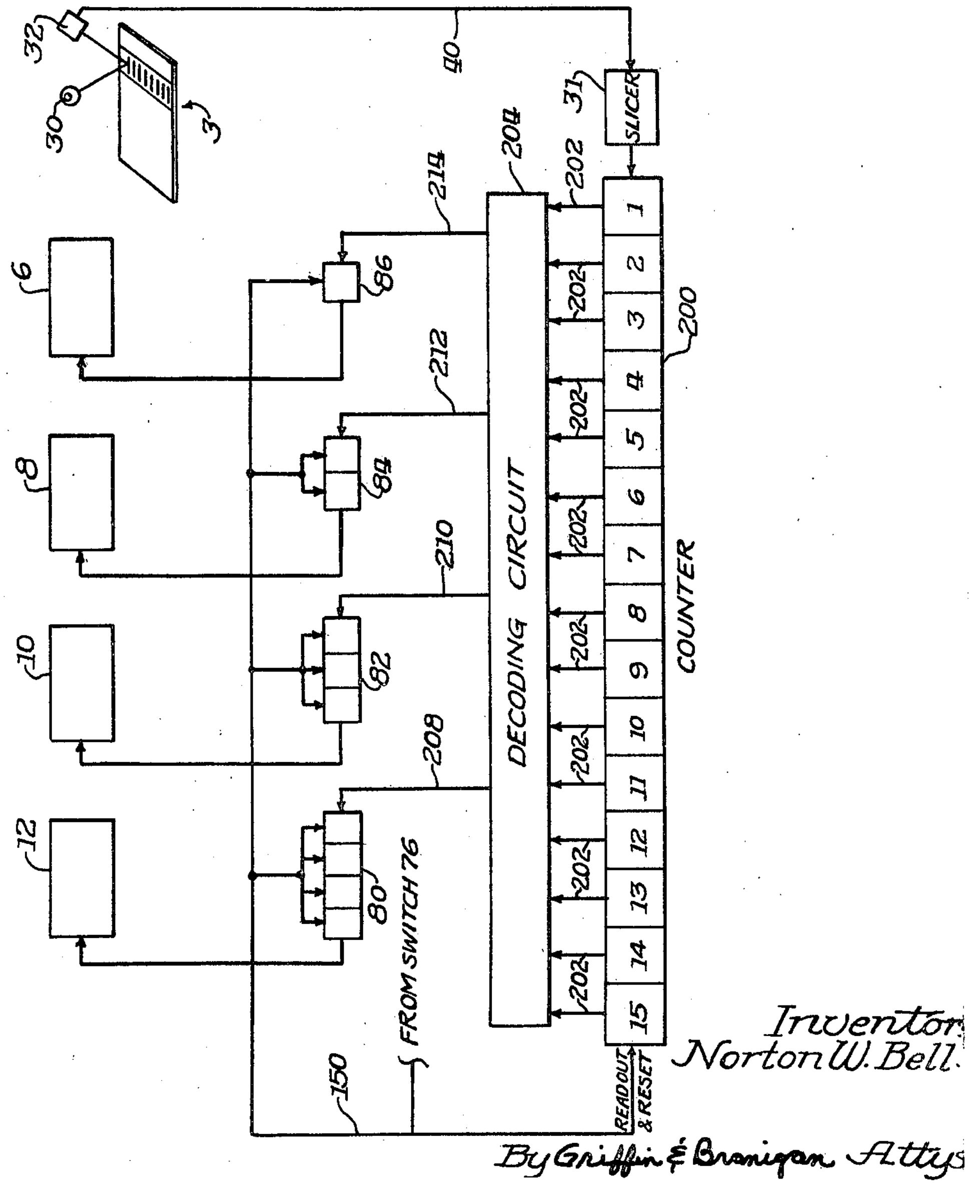
FIG. 7 is a schematic diagram of still another alternative embodiment of the insertion machine control system. This embodiment includes a decoding circuit for obtaining control of randomly selected insertion stations.

Assuming that it is desired to use this embodiment with an insertion machine having four insertion stations, the hyphen field 29 contains fifteen hyphen positions rather than four. As in the first embodiment the hyphen derived pulses from the photocell 32 are delivered to the slicer 31 whose output is delivered to the first stage of a fifteen stage hyphen counter 200 as shown in FIG. 7. This particular counter is of the type in which the stages are turned on one at a time and only one stage is on at any given time. That is, the first pulse from the slicer turns on the first stage; the second pulse from the slicer turns the second stage on the first stage off; the third pulse turns the third stage on the second stage off and so on until after the fifteenth pulse only the fifteenth stage is on.

Each of the hyphen counter's stages has an output line 202 to a decoding circuit 204 which is more fully shown in FIG. 9 and will be described in more detail shortly. The decoding circuit, in turn, has four outputs 208, 210, 212, and 214 which are connected to the four insertion station control registers 80, 82, 84, and 86, respectively. Aside from these structural changes the circuit is substantially the same as that described in connection with the FIG. 1 embodiment.

Figure 8:
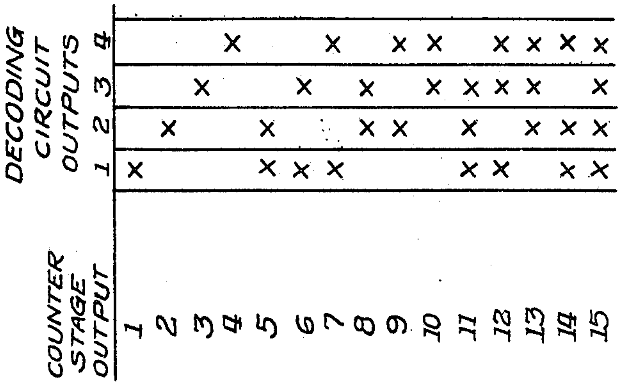
FIG. 8 is a chart for a code that is suitable for use with the decoding circuit of FIG. 9.

The code chart of FIG. 8 illustrates the correlation between the number of hyphens in a particular master document and the various combinations of insertion stations that are actuated thereby. For example, if it is only desired to add material from the first insertion station, the related master document would only contain one hyphen; if only the second insertion station's material were to be added to a given master document it would contain two hyphens; if it were desired that both the first and second insertion stations be actuated, then the particular master document would contain five hyphens; if it were desired to add material from the first, third, and fourth stations the master document would contain twelve hyphens and so on as may easily be determined from the chart of FIG. 8. In this respect it will be appreciated that anyone of a host of different codes could be used. The one just described, however, is simple and easy to remember which are important factors to consider where operational and maintenance personnel are concerned.

Figure 9:
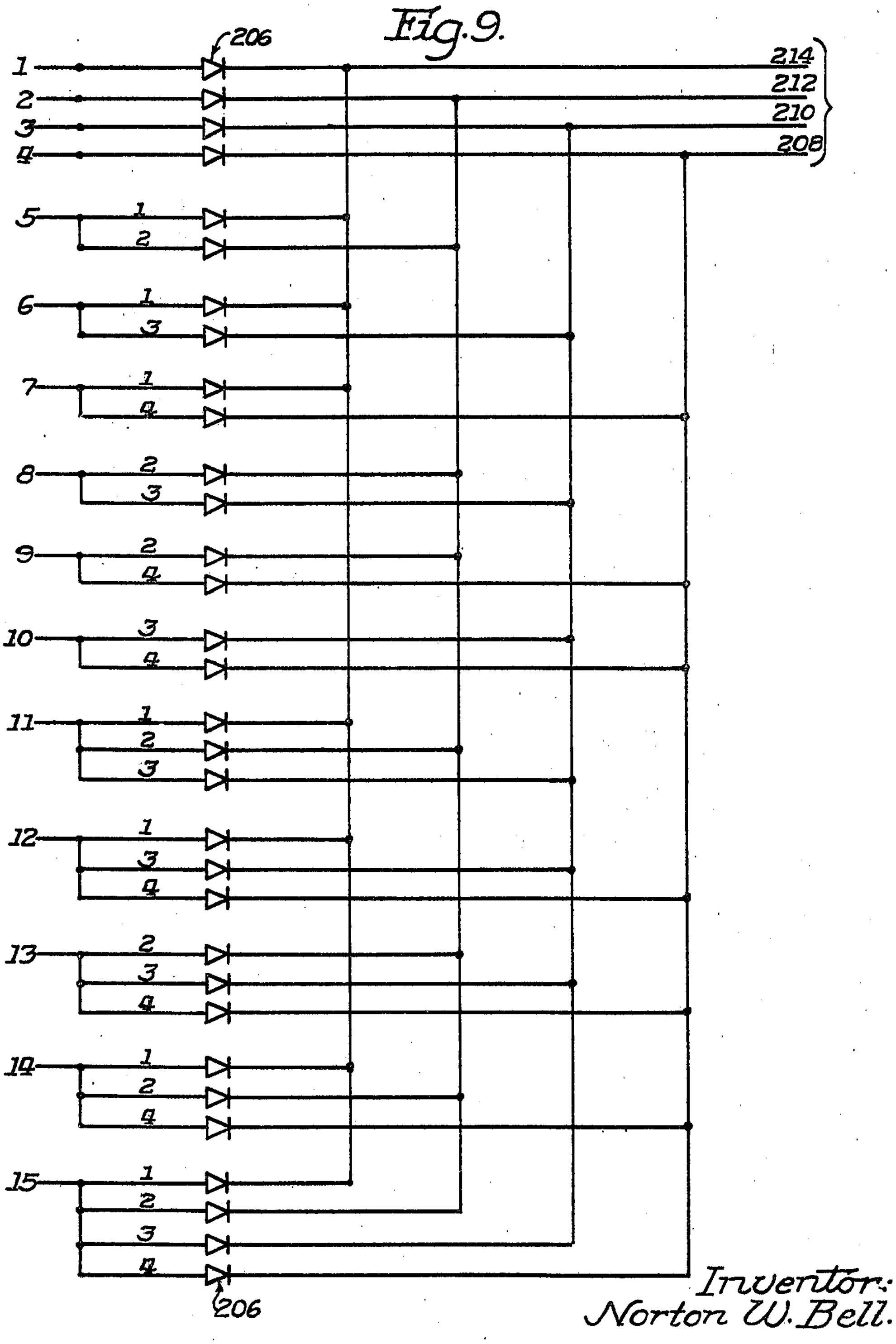
FIG. 9 is a line diagram of a decoding circuit which is suitable for use with the FIG. 7 embodiment of the invention.

A suitable coding circuit is illustrated in FIG. 9. On the left hand side thereof, the numbers 1 through 15 represent the various inputs to the decoding circuit 204 on lines 202 from the various stages of the counter 200. Each of these inputs is delivered to one or more of a plurality of suitable feedback isolation diodes 206. The outputs from each of these diodes is in turn delivered to a particular one of the first stages of the insertion station control registers 80–86 on lines 208, 210, 212, and 214, respectively. It should be noted that each of the first four inputs to the decoding circuit are delivered to single diodes each of which is respectively connected to one of the insertion station control registers by a corresponding line 214. The input from the fifth counter stage, on the other hand, is delivered to two of the isolating diodes 206, one of which is connected to the first control register on line 214 and the second of which is connected to the second control register on line 208. This is in accordance with the code chart of FIG. 8 wherein five hyphens indicate the desirability of actuating the first and second insertion stations. Similarly, as a final example, an input from the twelfth counter stage on one of the lines 202 is delivered to three of the feedback isolation diodes 206 whose outputs are delivered to the first, third, and fourth control registers on lines 214, 210, and 208. Consequently, if a particular master document contains twelve hyphens in its hyphen field it will subsequently receive material from the first, third, and fourth insertion stations as that particular master document is moved along the main feed track.

Except for the decoding circuit the operation of this embodiment is substantially the same as that described in connection with the FIG. 2 embodiment. Hence, having described the structure of this alternative embodiment its operation will only be very briefly described in connection with FIG. 7.

Assume for the moment that there are no document stacks on the machine's main feed track and that the first master document is about to be fed from the high speed feeder. Also assume that it is desired to add insertion material from each of the first, third, and fourth insertion stations to this particular master document's stack, whereby the master document's field will contain twelve hyphens.

As the master document passes under the photocell reader, therefore, the slicer both receives and produces a series of twelve pulses. The first of these pulses is delivered to the counter's first stage turning it on. The next pulse causes the first stage to be turned off and the second stage ot be turned on and so on until the twelfth pulse causes the counter's twelfth stage to be turned on and all of the remaining stages of the counter to be off. This, therefore, is the state of the counter 200 when it is read out and reset by a pulse on line 150 from the cam operated switch 76. When this occurs the decoding circuit passes the counter's output pulse to the input stages to each of the first, third, and fourth insertion station control registers, 86, 86, and 80.

As soon as the next machine cycle is completed, and the above described master document is opposite the first insertion station, the cam 70 again opens the first cam switch 76. This causes the first stage of each insertion station control registers to be shifted into the respective register's second stage; and in the case of the first control register, the actuation of the first insertion station, whereby the first master document receives its designated insertion material. This sequence is continued in the same manner as was previously described until the first master document also receives material from the third and fourth insertion and its entire stock of documents is inserted into a mailing envelope.

The embodiment just described provides a simple means for obtaining selective control of random insertion stations without the requirement of either a shifting type of counter register or a clock. Hence, it is not dependent for its accuracy upon the master documents being fed at a specific speed.

Moreover, when the structures of either of the latter two embodiments are combined with the complete circuit of FIG. 1, they are further operative to control both the high speed feeder and the insertion machine's overall operation is optimized. That is, the condition of the counter's various stages at predetermined times insures that the main feed is only shut down in the event that a particular customer's subordinate card cannot be fed in one machine cycle; and also insures that each master document stack only receives those insertion materials which are dictated by the hyphen-code on that particular document. In this manner, the machine runs at its maximum rate while, in the specific examples provided it provides a selection of any one of fifteen combinations of insertion materials that can be placed with a particular master document. Moreover, by increasing the number of insertion stations and hyphens the number of insertion material combinations can be greatly increased.

While the invention has been particularly shown and described with reference to preferred embodiments thereof, it will be understood by those skilled in the art that various changes in form and detail may be made therein without departing from the spirit and scope of the invention. For example, although electromechanical relays have been used to illustrate the high speed feeder's clutch-brake control, a solid state control system could also be employed.

The embodiments of the invention in which an exclusive property or privilege is claimed are defined as follows:

1. In an insertion machine of the type in which a high speed feeder moves groups of documents past a sensing station to an insertion track which moves each of said groups past a different one of a plurality of insertion stations during each machine cycle; said insertion stations adapted to add additional material to said groups wherein each of said groups of documents is comprised of a master document having serially positioned control indicia thereon and a variable number of subordinate documents, the improvement comprising:

a sensing means positioned with respect to the path of said documents from said high speed feeder for serially sensing the serially positioned control indicia on each of said master documents and serially generating an output pulse in response to each indicium;

a counter for serially counting the output pulses derived from a first of said master documents;

readout means for generating readout pulses representative of the count in said counter; and, insertion station control means responsive to said readout pulses for controlling the subsequent operation of said insertion stations so that the first group of master and subordinate documents have material from said insertion stations subsequently added thereto in accordance with the count in said counter that was derived from the indicia on said first master document.

2. Apparatus according to claim 1 including means responsive to the output pulses derived from a second of said master documents to stop said high speed feeder.

3. Apparatus according to claim 2 including first signal means for generating a first signal at the end of each machine cycle;

second signal means for producing a second signal indicating that said high speed feeder is operating; and, insertion track control means operative in response to the simultaneous occurrence of said first and second signals for stopping said insertion track.

4. Apparatus according to claim 1 wherein each of said control indicia has a predetermined position on each of said master documents and represents a corresponding insertion station.

5. Apparatus according to claim 4 including means responsive to the output pulses derived from a second of said master documents to stop said high speed feeder.

6. Apparatus according to claim 5 including first signal means for generating a first signal at the end of each machine cycle;

second signal means for producing a second signal indicating that said high speed feeder is operating; and insertion track control means operative in response to the simultaneous occurrence of said first and second signals for stopping said insertion track.

7. Apparatus according to claim 4 wherein said counter is comprised of a plurality of stages, there being one stage corresponding to each of said insertion stations and the state of each of said counter stages represents a corresponding one of said predetermined indicia positions.

8. Apparatus according to claim 7 including means responsive to the output pulses derived from a second of said master documents to stop said high speed feeder.

9. Apparatus according to claim 8 including first signal means for generating a first signal at the end of each machine cycle;

second signal means for producing a signal indicating that said high speed feeder is operating; and insertion track control means operative in response to the simultaneous occurrence of said first and second signals for stopping said insertion track.

10. Apparatus according to claim 7 including first signal means for generating a first signal at the end of each machine cycle; and wherein said insertion station control means is comprised of a storage means corresponding to each of said counter stages whereby each storage means corresponds to a particular insertion station past which the first group of documents is sequentially moved;

each of said storage means having a number of stages corresponding to the number of insertion stations that each group of documents passes prior to arriving at the insertion station related to the particular storage means;

said first signal being operative to readout said counter and the highest ordered stage of each of said storage means; and each of said storage means being operative on readout to produce an insertion station operating signal whereby the related insertion station adds its material to the group of documents at that insertion station.

11. Apparatus according to claim 10 including means responsive to the output pulses derived from a second of said master documents to stop said high speed feeder.

12. Apparatus according to claim 11 including first signal means for generating a first signal at the end of each machine cycle;

second signal means for producing a signal indicating that said high speed feeder is operating; and insertion track control means operative in response to the simultaneous occurrence of said first and second signals for stopping said insertion track.

13. Apparatus according to claim 1 wherein the master document has a predetermined number of indicia positions and said control indicia are arranged at selected ones of said indicia position so as to indicate a randomly selected one or more of said insertion stations; and said count in said counter is representative of said one or more randomly selected insertion stations, whereby said insertion stations are adapted to be controlled so that said first master document receives material from selected adjacent or non adjacent insertion stations in accordance with the arrangement of said indicia.

14. Apparatus according to claim 13 including means responsive to the output pulses derived from a second of master documents to stop said high speed feeder.

15. Apparatus according to claim 14 including first signal means for generating a first signal at the end of each machine cycle;

second signal means for producing a second signal indicating that said high speed feeder is operating; and insertion track control means operative in response to the simultaneous occurrence of said first and second signals for stopping said insertion track.

16. Apparatus according to claim 13 wherein said counter is comprised of a plurality of stages corresponding to said indicia positions, said counter having the stages thereof turned on or not by said output pulses in accordance with a predetermined code.

17. Apparauts according to claim 16 including means responsive to the output pulses derived from a second of said master documents to stop said high speed feeder.

18. Apparatus according to claim 17 including first signal means for generating a first signal at the end of each machine cycle;

second signal means for producing a second signal indicating that said high speed feeder is operating; and insertion track control means operative in response to the simultaneous occurrence of said first and second signals for stopping said insertion track.

19. Apparatus according to claim 16 including a decoder between said readout means and said insertion station control means for directing said readout pulses to said insertion station control means in accordance with the selection indicated by said indicia.

20. Apparatus according to claim 19 including means responsive to the output pulses derived from a second of said master documents to stop said high speed feeder.

21. Apparatus according to claim 20 including first signal means for generating a first signal at the end of each machine cycle;

second signal means for producing a second signal indicating that said high feeder is operating; and insertion track control means operative in response to the simultaneous occurrence of said first and second signals for stopping said insertion track.

22. Apparatus according in claim 19 including first signal means for generating a first signal at the end of each machine cycle; and wherein said insertion station control means is comprised of a storage means corresponding to each of said counter stages whereby each storage means corresponds to a particular insertion station past which the first group of documents is sequentially moved;

each of said storage means having a number of stages corresponding to the number of insertion stations that each group of documents passes prior to arriving at the insertion station related to the particular storage means;

said first signal being operative to readout said counter and the highest ordered stage of each of said storage means; and each of said storage means being operative or readout to produce an insertion station operating signal whereby the related insertion station adds its material to the group of documents at that insertion station.

23. Apparatus according to claim 22 including means responsive to the output pulses derived from a second of said master documents to stop said high speed feeder.

24. Apparatus according to claim 23 including first signal means for generating a first signal at the end of each machine cycle;

second signal means for producing a signal indicating that said high speed feeder is operating; and insertion track control means operative in response to the simultaneous occurrence of said first and second signals for stopping said insertion track.

References Cited

UNITED STATES PATENTS

| | | | |
|---|---|---|---|
| 3,049,845 | 8/1962 | Hanson | 270—58 X |
| 3,258,118 | 6/1966 | Gesell | 209—74 |
| 3,259,240 | 7/1966 | Schneider | 209—74 |
| 3,260,517 | 7/1966 | Sather | 270—58 |
| 3,271,022 | 9/1966 | Sather et al. | 270—58 |
| 3,352,417 | 11/1967 | Cutaia | 209—74 |
| 3,368,672 | 2/1968 | Heaney et al. | 209—74 X |

EUGENE R. CAPOZIO, Primary Examiner

P. V. WILLIAMS, Assistant Examiner

U.S. Cl. X.R.

53—62